United States Patent [19]

Haluska

[11] 4,118,169

[45] Oct. 3, 1978

[54] MOLDING APPARATUS

[76] Inventor: Jerald R. Haluska, 14729 S. Clifton Park, Midlothian, Ill. 60445

[21] Appl. No.: 764,900

[22] Filed: Jan. 17, 1977

[51] Int. Cl.² ............................................. A22C 7/00
[52] U.S. Cl. ...................................... 425/583; 17/32; 425/256; 425/578
[58] Field of Search ..................... 17/32; 425/251, 256, 425/260, 258, 583, 578

[56] References Cited

U.S. PATENT DOCUMENTS

| | | | |
|---|---|---|---|
| 2,270,829 | 1/1942 | Wellnitz | 425/260 X |
| 2,413,046 | 12/1946 | Holly | 17/32 |
| 2,475,463 | 7/1949 | Santo | 17/32 |
| 2,787,808 | 4/1957 | Holly | 17/32 |
| 2,799,893 | 7/1957 | Esper | 17/32 |
| 3,347,176 | 10/1967 | Hall | 17/32 X |
| 3,491,401 | 1/1970 | Holly | 17/32 |
| 3,731,345 | 5/1973 | Brackman | 425/251 X |
| 3,765,056 | 10/1973 | Holly | 17/32 |
| 4,043,728 | 8/1977 | Holly | 425/256 |

Primary Examiner—Francis S. Husar
Assistant Examiner—William R. Briggs
Attorney, Agent, or Firm—John J. Kowalik

[57] ABSTRACT

A simplified molding apparatus comprising a hopper adapted to contain ground meat or any other moldable food product which is fed into an intake in a movable portion of a mold for forcing the meat through a passage into a molding cavity, the cavity being aligned vertically with a knock-out punch which descends from above the cavity and knocks the formed patty downwardly onto a paper wrapper moving thereunder on a conveyor, the operation of the mold, the movement of the conveyor and the up and down movement of the knock-out punch being coordinated by appropriately proportioned linkages connected to a common drive source.

8 Claims, 18 Drawing Figures

MOLDING APPARATUS

DISCUSSION OF THE PRIOR ART

There are numerous patented and commercial devices for forming meat patties. I have found that in general these devices are very expensive and subject to critical controls and have extensive drives which are difficult to correlate to obtain synchronism between the various operating components. Parts are difficult to clean and costly to make.

SUMMARY OF THE INVENTION

This invention is directed to a novel, efficient and simple apparatus in which the meat hopper in the preferred embodiment is reciprocated with the compressor assembly to insure agitation of the meat products with the hopper, to cause it to drop onto rotary conveying fingers extending across the hopper for feeding the food product into the inlet of the patty-forming mold assembly.

One of the principal objects of the invention is to provide in an apparatus of the type described a novel mold assembly which comprises a plurality of flat interleaved plates, certain of which are stationary and others of which slide therebetween, the assemblage of plates being easily separable for cleaning and manufacture.

A further object is to provide in a mold assembly of the type described above, a mold plate which not only contains a mold cavity that predetermines the size and shape of the food product to be molded, but also, serves as a cut off plate from the hopper supply, predetermines the quantity of food product to be captured for filling the mold cavity, and forms one side of the compression chamber where the food product is forced to cause the product to flow into a storage passageway to be used to mold the final product.

A further object is to provide a novel meat packer in which the slidable plates are connected to a resilient pitman operative of a lever which in swingable to and fro and vertically reciprocates the knock-out punch and also oscillates a pivot shaft to which the level is connected, the shaft operating a step-by-step ratchet drive which cocks the mechanism into firing position preparatory to actuation of the patty ejector.

A further object is to provide an apparatus of the type described whereby a knock-out cup is at all times directly aligned with the mold cavity, thus eliminating timing between the mold cavity and the knock-out cup.

A further object is to provide a molding apparatus in which the knock-out mechanism also controls the timing of a paper cutting knife.

These and other objects and advantages inherent in and encompassed by the invention will become more apparent from the specification and the drawings, wherein:

FIGS. 10 and 11 illustrate a further embodiment of the invention;

FIGS. 12-15 illustrate a still further embodiment;

DESCRIPTION OF FIGS. 1-9a

In this embodiment the invention discloses a molding apparatus generally designated 1 comprising a base or main frame 2 which has end frames 4 and 5 with legs adapted at their lower ends to bear upon the floor 6 and side frames 7 interconnecting the end frames, and the operating mechanism generally designated 10 is mounted on the frame and comprises a mold plate assembly 12 which includes a flat top plate 13 which has a flat bottom side 14 slidably engaging a flat top side 15 of the stationary mold plate 16. Plate 16 is somewhat Y-shaped in plan having a cut-out 18 at the discharge end 19 of the mold flanked by a pair of laterally-spaced legs 20, 21 joined to the main plate or body section 22 which adjacent to the cut-out 18 is provided with a circular aperture 25 defining the patty-forming cavity.

Figures 5, 6, 7:
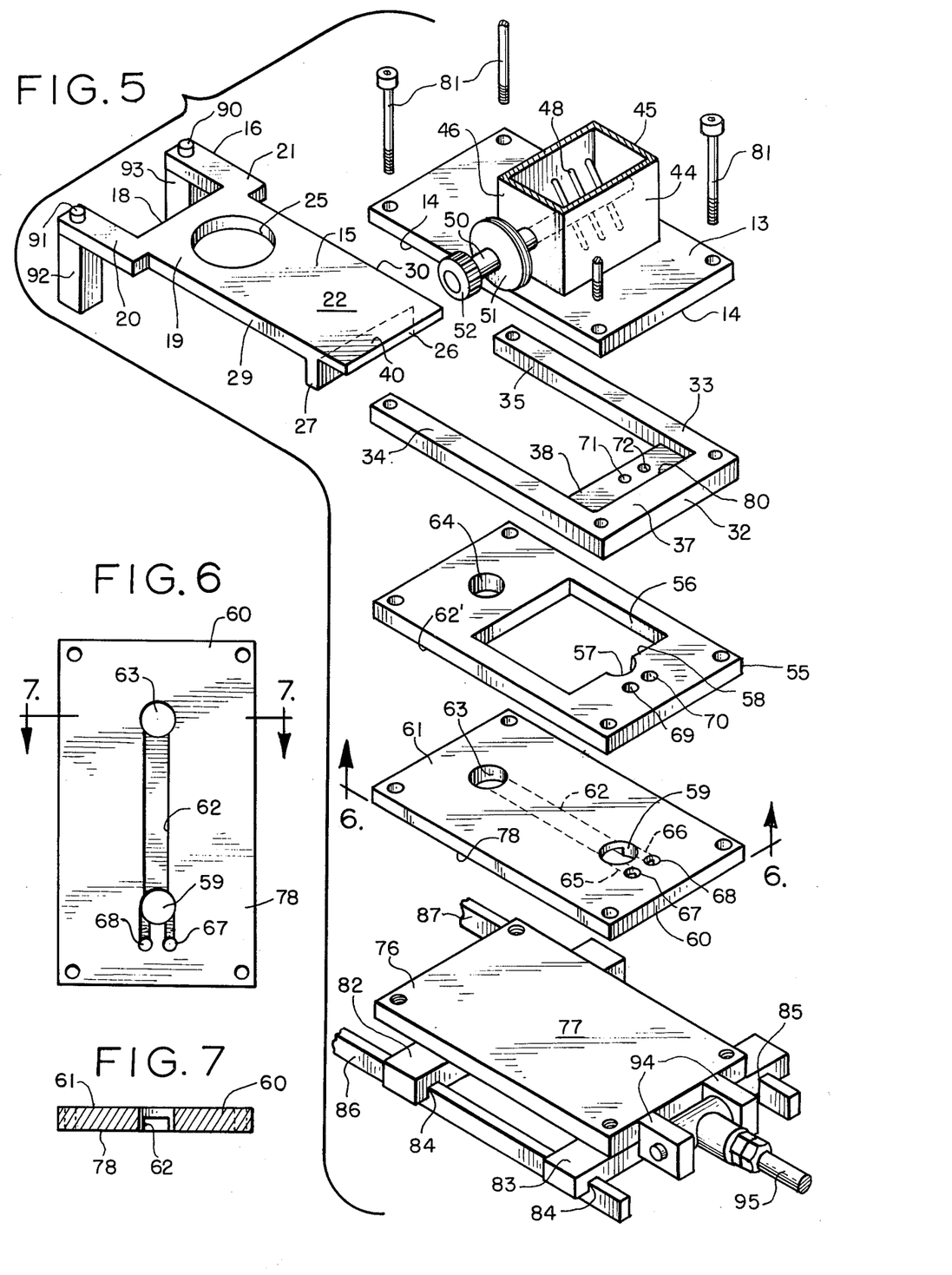
FIG. 5 is an exploded view of the mold and hopper assembly.
FIG. 6 is a bottom view of the plate shown in FIG. 5 taken on line 6—6.
FIG. 7 is an end view of the plate shown in FIG. 6.

The opposite end of the plate section 22 presents a flat edge 26 and inwardly of this edge there is provided on the bottom side of the mold plate 16 a depending scavenging sweep 27 parallel with edge 26 and perpendicular to the parallel vertical side edges 29, 30 of the portion 22 of the mold plate.

A U-shaped spacer plate 32 has a flat top face 33 engaging the flat bottom surface 14 of the top plate 13 and has a pair of laterally spaced legs 34, 35 aligned with the legs 20, 21 respectively of the mold plate and the legs 34, 35 have inner parallel side edges slidably engaging edges 29, 30 of the body portion or main plate section 22. The legs 34, 35 of the spacer plate are interconnected by a transverse bight section 37 which has a shelf portion 38 which is offset below the upper face 33 and complementing the thickness of the thin ledge portion 40 of mold plate 16 and extending rearwardly from the sweep 27. The ledge portion 40 together with the body section 22 provide a closure for the bottom outlet aperture 42 of the meat or product hopper 41 which has a perferably funnel-shaped bin portion 43 of quadrilateral shape with an open top and at its lower end has a tubular preferably rectangular section 44 communicating with aperture 42.

Figures 1, 1A:
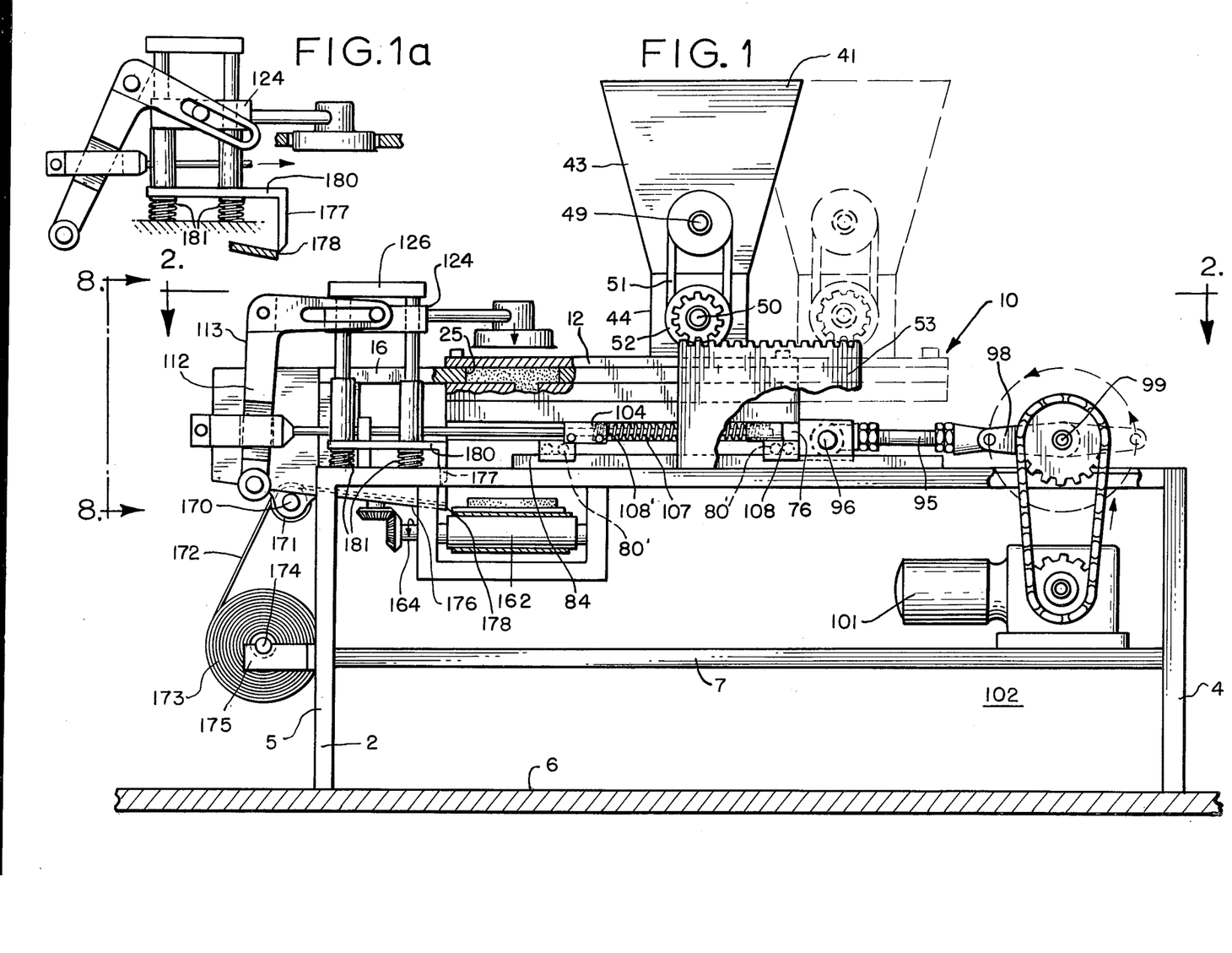
FIG. 1 is a side elevational view partly broken-away of the novel apparatus.
FIG. 1a is a fragmentary portion of FIG. 1 showing the knock-out punch in lowered patty-discharging position.
Figure 3:
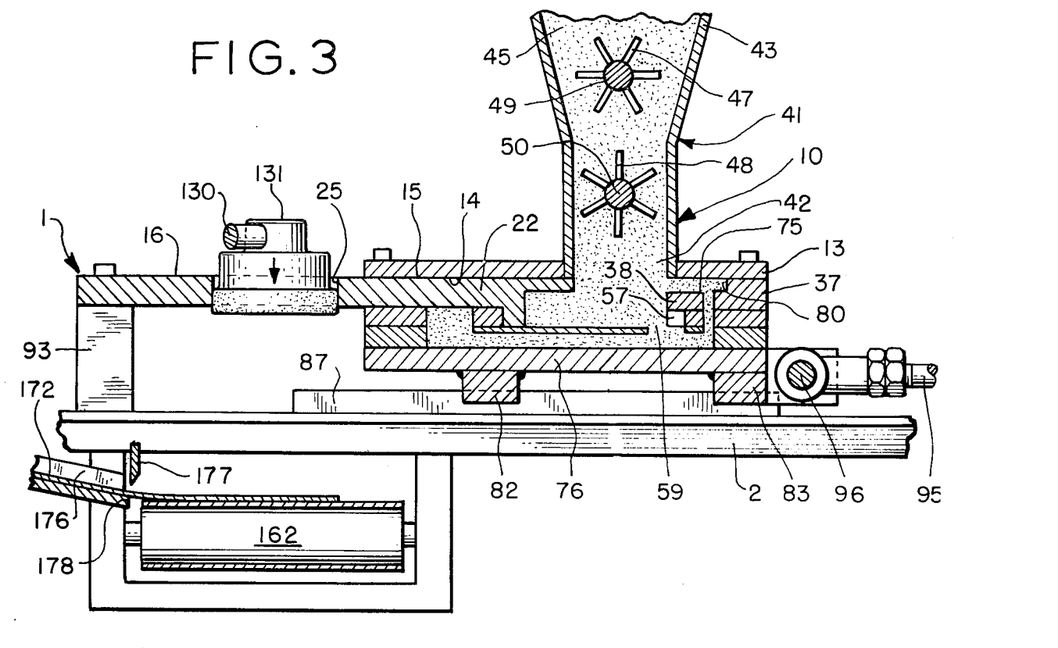
FIG. 3 is a cross-sectional view taken substantially on line 3—3 of FIG. 2.
Figure 4:
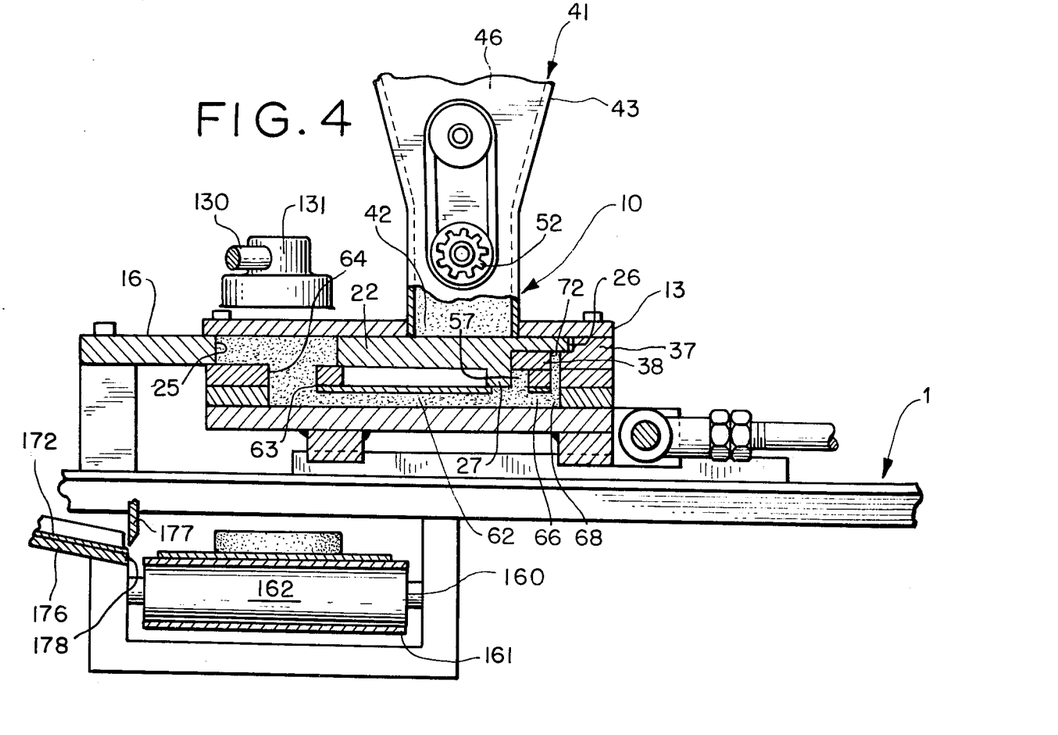
FIG. 4 is a cross-sectional view similar to FIG. 3 but showing the parts displaced leftwardly compressing the meat and forming the patty.

The hopper has opposed side walls 45, 46 thereof journalling upper and lower fingered combination rotary mixer-finger bars 47, 48, said mixer-fingers having shafts 49, 50 interconnected by belt and pulley or chain and sprocket drive 51. The lower shaft 50 is provided with a pinion gear 52 which meshes with a rack 53 mounted on the top frame element 54 of the frame structure, whereby upon the movable mold section or assembly reciprocating, the lower shaft is oscillated and through the drive train 51 oscillates upper shaft 49.

A metering plate 55 is underposed with respect to the mold plate and has an inlet or metering cavity 56 of rectangular shape, the depth and width of which except for clearance equals the depth and width, respectively, of the sweeper paddle 27 which extends thereinto the fore and aft dimension of the metering cavity, the length of which is approximately equal to the stroke of the mold assembly. An arcuate notch 57 indents the rear edge 58 of the metering cavity and vertically aligns with and complements an inlet port 59 in the transition plate 60 below. Shelf 38 covers the top of notch 57. Plate 60 has a top surface 61 which fits complimentally against the bottom 62' of the metering plate 55 and has a fore and aft passage or transfer channel 62 in its underside, which extends from the port 59 to an outlet port 63 which extends through plate 60 and communicates with a transfer port 64 in the metering plate, which in turn communicates with the patty mold cavity 25.

The inlet port 59 is connected to a pair of rearwardly extending channels 65, 66 which form part of the excess return system generally designated 67. Channels 65, 66 communicate with passages 67, 68 in plate 60 and these line up with and lead into passages 69, 70 in plate 55 and passages 69, 70 lead into passages 71, 72 in the shelf of plate 32 which, being spaced below the top plate 13, provides a passage 75 leading to an area above and behind the metering chamber into the supply, whereby upon the movable section of the mold plate assembly, including the base plate 76 which has its flat top face 77 complementally pressed against the flat underside 78 of plate 60, moving forwardly the meat in the metering chamber, will squeeze out through the notch 57 into port 59 and through the passage 62, port 63, and transfer port 64 into the patty-forming cavity 25. The basic idea is to have the scavenging sweep 27 or shovel capture a volume of meat slightly greater than the volume of meat which is to be molded into cavity 25. The volume of meat captured by shovel 27 through the action of the movable mold is forced into notch 57, hole 59, channel 62, hole 63, 64 where this meat is stored until the next compression stroke when the shovel again captures the same volume of meat which is forced into notch 57 thereby forcing the quantity of meat stored previously in hole 59, channel 62, and holes 63, 64 into mold cavity 25. The meat forced into notch 57 during the previous compression stroke is then stored in hole 59, channel 62, and holes 63, 64 until the next compression stroke thereby maintaining the storage transfer passageway filled with the product. This continues until the desired number of patties have been produced. Any excess meat trapped between the rear edge 80 of the ledge portion 38 and ledge portion 40 of mold plate 16 will be forced downwardly through the passages 71, 69, 67 and 72, 70, 68 into the transfer passage 62.

Figure 2:
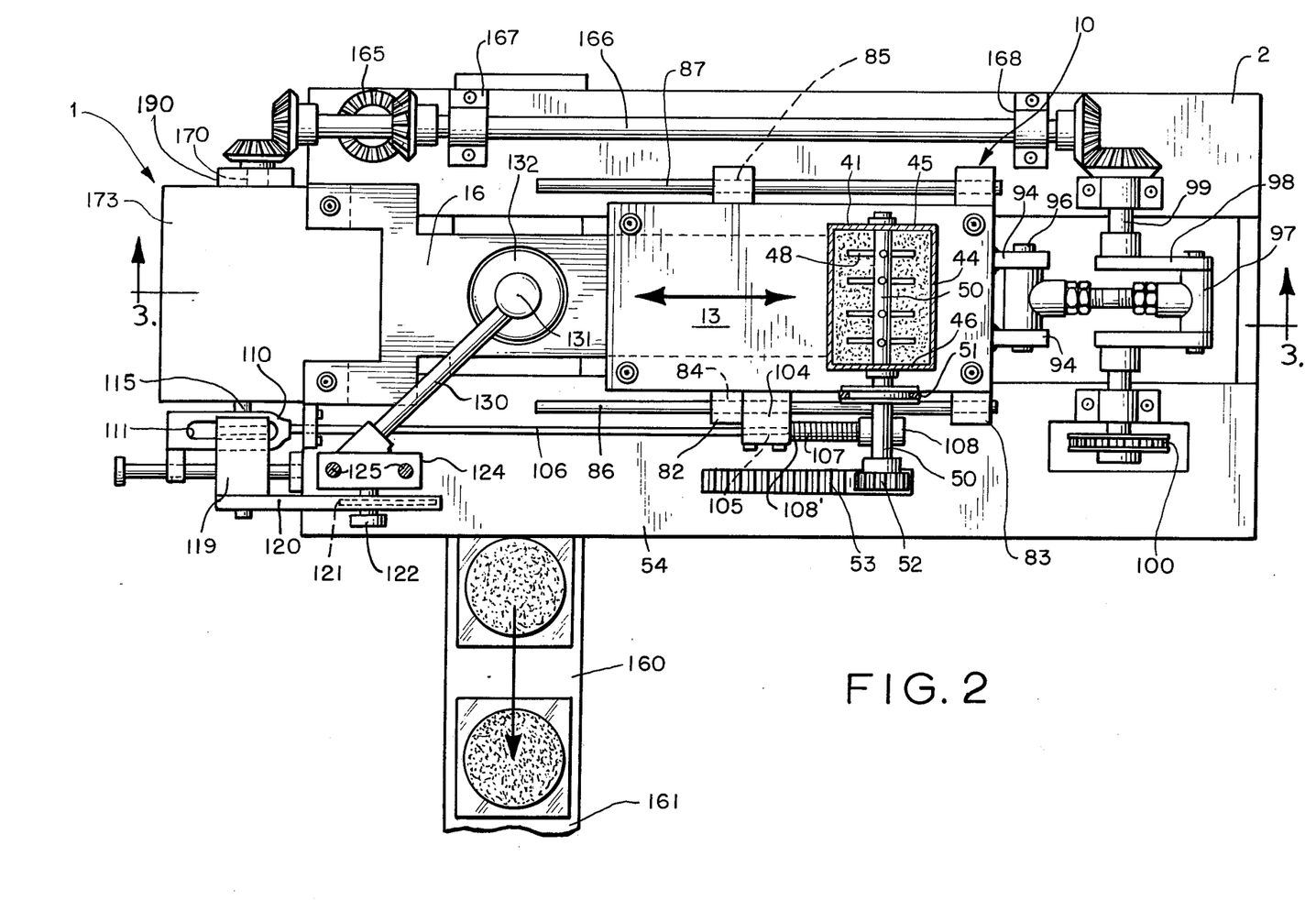
FIG. 2 is a top plan view partly in section of FIG. 1 taken substantially on line 2—2.

The bottom or base plate 76 is provided with transverse carriers 82, 83 which at opposite ends have guide channels 84, 85 slidably fitting onto fore and aft extending guides or rails 86, 87 mounted on the top of the frame support. Transverse carriers 82, 83 have ball bearings 80' mounted in their respective channels 84, 85 which roll on the top surface of the guides or rails 86, 87. It will be observed that the legs 20, 21 are connected at their distal ends by bolts 90, 91 to stand off blocks or supports 92, 93 mounted on the frame top.

The movable mold comprising plates 13, 32, 55, 60 are secured to plate 76 by bolts 81. The movable mold portion is connected by a pair of ears 94, 94 extending rearwardly from the base plate to the front end of a pitman 95 by a pivot pin 96 and the rear end of the pitman is journaled at 97 to a rotary crank arm 98, having shaft extensions 99 suitably journalled on the support frame. One of the extensions 99 is driven by a chain and sprocket drive 100 from a motor and speed reducer 101 mounted on the frame shelf 102.

The movable mold portion is provided with an anchor block 104 at one side movable therewith and has a horizontal bore 105 slidably receiving an intermediate portion of a push rod 106 therethrough. The inner end portion of rod 106 has a spring 107 sleeved thereon. The spring is secured at one end to a stop 108 threaded on the free end portion of rod 106 and the other end of the spring is secured at 108' to the block 104. The block 104 and rod are intended to move together rightwardly, FIGS. 1 and 2 attendant to compression of spring 107. The rod has a jaw or connector 110 at its forward or outer end which comprises a slot 111 open at the top and bottom and through which the vertical leg 112 of a bell-crank lever 113 extends.

Figure 8:
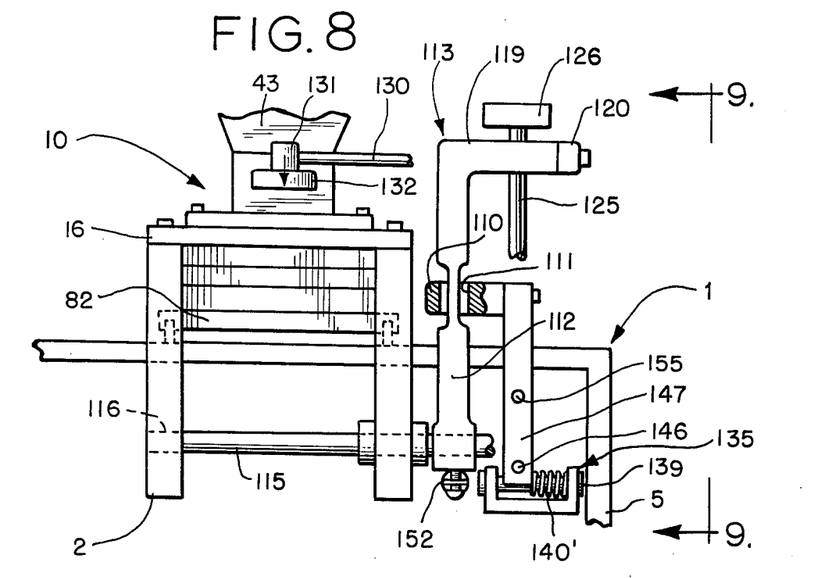
FIG. 8 is a fragmentary end view of the discharge end of the apparatus showing the parts in pre-discharging position.
Figure 8A:
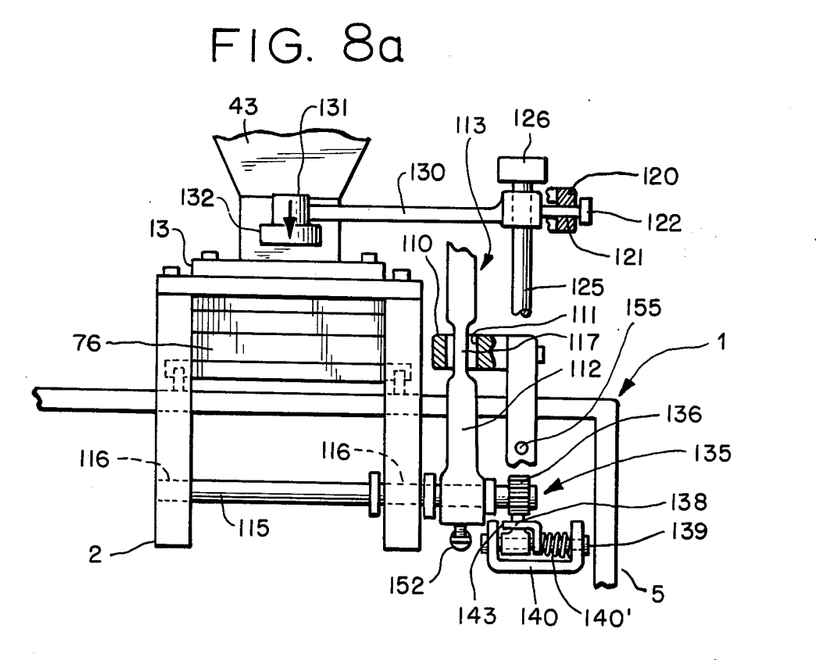
FIG. 8a is a view similar to FIG. 8 but showing additional parts of the patty knock-out in pre-discharging position.

The lever 113 is connected at the lower end of leg 112 to a horizontal shaft 115 which is suitably journalled at 116 to the main frame. The intermediate portion 117 of the leg 112 is of reduced thickness as seen in FIG. 8a to provide necessary clearances with the jaw 110, and the upper end of leg 112 is connected in an elbow arrangement 119 to the inner end of the fore and aft extending leg 120 of the lever 113.

Leg 120 has an elongated slot 121 therethrough intermediate its ends and receives a horizontal pin 122 therethrough which is connected to a vertical slide block 124 guidably mounted for vertical movement on a pair of vertical guide pins 125, 125. The pins 125 are connected at their upper ends by a brace 126 and at their lower ends are suitably secured either by threaded connections or press-fit or otherwise to the top main frame member.

Figure 9:
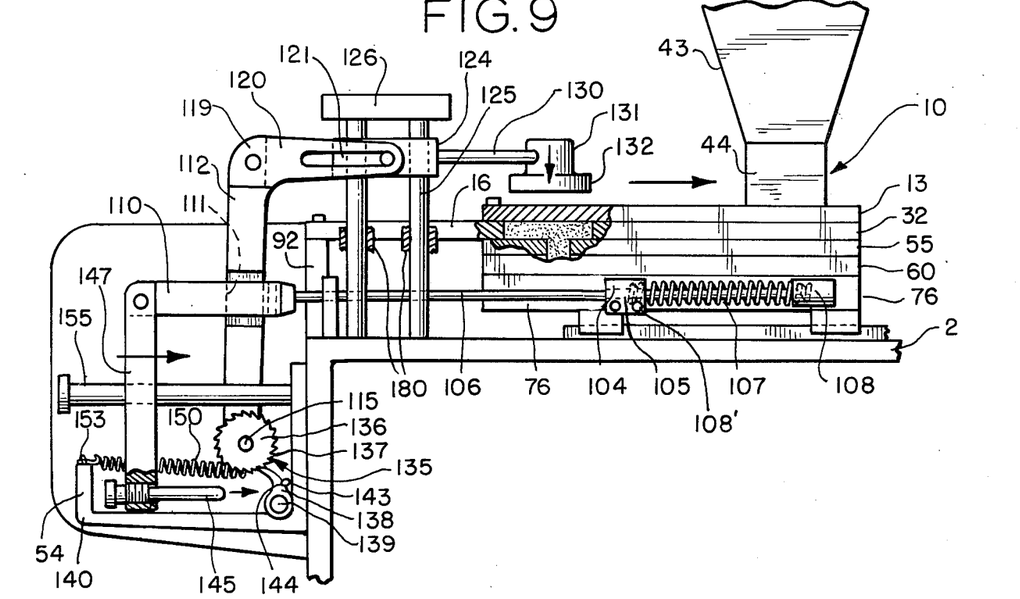
FIG. 9 is a fragmentary side elevational view of the apparatus showing details of the patty knock-out.
Figure 9A:
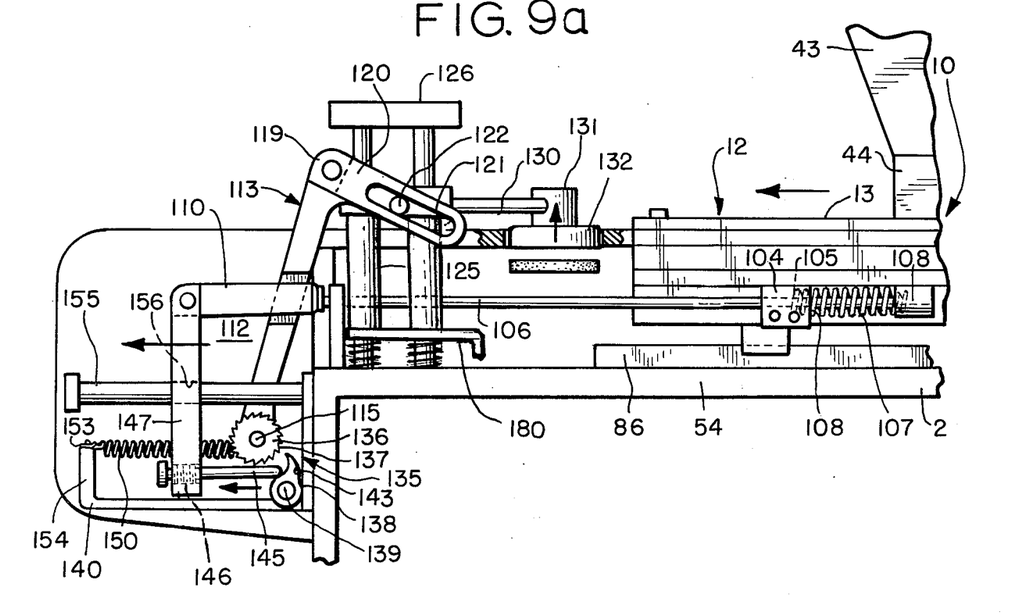
FIG. 9a is a view similar to FIG. 9 showing the parts in knock-out position.

As best seen in FIG. 2, the grid block 124 is provided with a laterally extending arm 130 at its inner side, which at its free end is connected to a vertical mounting extension 131 of a plunger, tamper or ejector 132 which comprises a circular disk adapted to fit and reciprocate through the patty mold cavity 25 to knock-out the formed patty therein as best seen in FIG. 9a.

The shaft 115 is part of a cocking mechanism 135 for the tamper which comprises a ratchet wheel 136 connected to shaft 115. The wheel 136 has peripheral teeth 137 which are engaged by a locking pawl 138 which is mounted on a pin 139 on bracket 140 parallel with shaft 115. Pawl 138 is biased to engaging position with the teeth 137 by a torsion spring 140' (FIGS. 8, 8a) which has one end connected to a frame mounted bracket 140.

The other end 143 of the spring 140' bears behind the pawl as at 144 and urges it toward the ratchet.

A pawl release pin 145 is adjustably threadably mounted in a bore 146 in the lower end of mounting arm 147, which is connected to jaw 110, the release pin being directed toward and away from pawl 138 through the action of rod 106 and spring 107.

As best seen in FIG. 9 the push rod 106 had been moved leftwardly tensioning spring 107, thus moving the bell crank lever 113 from the position shown in FIG. 9a to that shown in FIG. 9. The pawl release pin, 145 releases pawl 138 and ratchet 136 rotates in a counter-clockwise direction (FIG. 9a), while the pawl 138 rides on the ratchet teeth of the ratchet. As the push rod 106 drives the lever 113 in a counterclockwise direction, it lifts the tamper and also moves the release-pin-carrying arm 147 leftwardly.

As the lever 113 is rotated counter-clockwise, it stretches a tension spring 150 which is connected at one end to an eye 152 (FIG. 8), depending from the lower end of lever 113 below the shaft 115. The spring 150 extends leftwardly, FIGS. 9, 9a, from eye 152, and is connected under tension at its other end to an eye 153 on an upturned portion 154 of the bracket 140.

The arm 147 is slidably supported for horizontal movement on a horizontal guide rod 155 which is suitably fixed at one end to the main frame. The rod 155 extends through a horizontal bore 156 (FIG. 9a) in the guide arm 147.

As best seen in FIGS. 9 and 9a the lever 113 is shown cocked in FIG. 9 and as the push rod 106 moves rightwardly and the movable mold section withdraws from under the mold plate, the pawl 138 is released (FIG. 9a) by the release pin and the lever 113 swings clockwise driving the tamper downwardly.

Beneath the patty dispenser there is shown a crosswise oriented conveyor 160 of the endless belt type, comprising a belt 161 trained about rollers 162, 162 which are journalled from the associated frame structure.

The shaft 164 of one roller 162 is driven via bevel gears from a vertical drive shaft 165 (FIG. 2) which has a bevel gear drive with a transfer shaft 166 journaled in bearings 167, 168 carried on the main frame. The transfer shaft has a bevel gear drive with the crank shaft 99. Shaft 166 also has a bevel gear drive with a horizontal shaft 170 which projects to a gear box 190, FIG. 2, and this drives a rubber roller 171 which meters paper tape 172 from a spool or roll of paper 173 carried on a free rolling shaft 174 mounted in a cradle 175 provided on the main frame. The paper is fed over a slide guide 176 mounted on the main frame and feeds transversely of the conveyor in a location directly below the tamper so that as each patty drops it falls on a paper sheet. Each sheet is suitably cut from the tape by a knife 177 which swings past the discharge edge 178 of the guide apron 176 and is actuated by the slide block 124 which in descending with the patty tamper engages the knife mounting assembly 180, urging it downwardly against springs 181, 181 sleeved over the guide rods and reacting between the bottom end of assembly 180 and the top of the main frame at 181.

Thus a novel, effective and simplified arrangement has been provided wherein the tamper is cocked during the patty molding cycle and is released during the fill cycle, the tamper mechanism also actuating the knife assembly which, being spring-mounted, dampens the end impact shocks upon the termination of the downward motion of the tamper.

Figure 10:
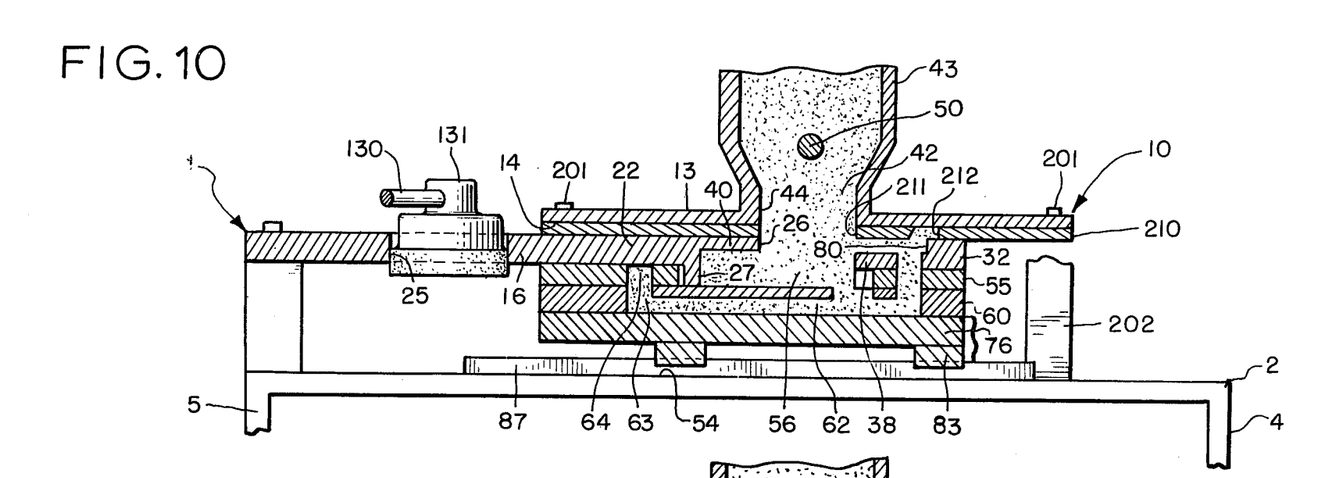
FIG. 10 being a longitudinal sectional view of the mold apparatus showing the mold in filling position.
Figure 11:
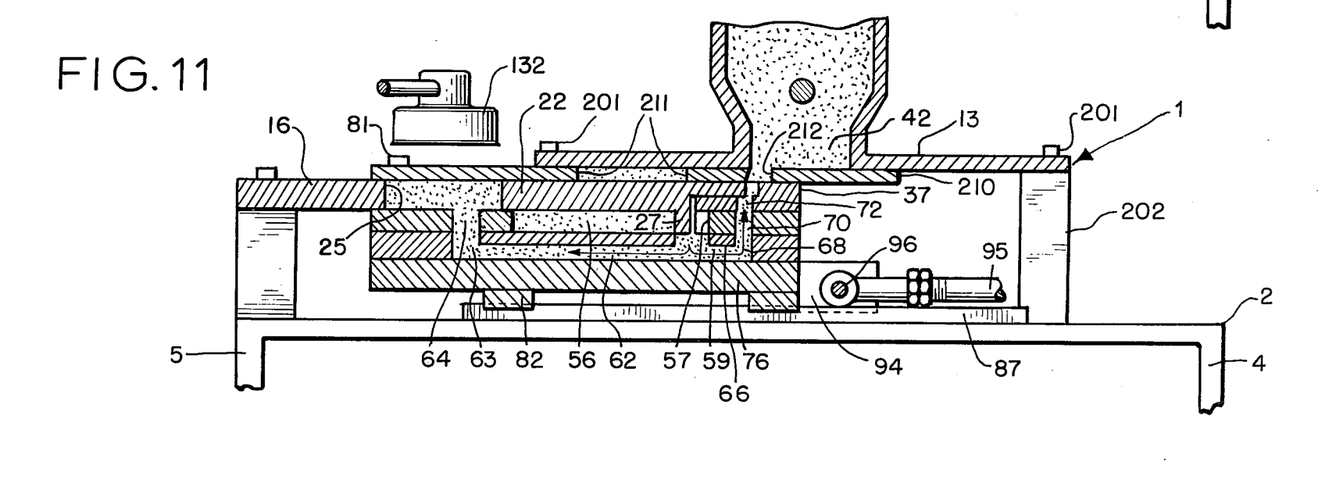
FIG. 11 being a similar section showing the mold in patty forming position.

DESCRIPTION OF FIGS. 10–11

Parts similar to the preferred embodiment will be identified by the same reference numerals.

This modification incorporates a stationary hopper 43 which contains rotary conveying fingers as before, but which are mechanically connected (not shown) to shaft 166, as in FIG. 2 and are continuously rotated in one direction. Hopper 43 is attached to plate 13 which is fastened by bolts 201 to mounting brackets 202 which are displaced both aft (shown) and fore (not shown) on opposite sides of plate 13 which is of greater width than previously shown, the brackets 202 being fastened to the main frame 2. An additional plate 210, of greater length than plates 32, 55, 60, 76, is positioned directly below plate 13 and directly above plate 32 and mold plate 16 whereby bolts 81 fasten plates 210, 32, 55, 60 to plate 76 which comprise the movable portion of the mold assembly. Bolts 81 slide between longitudinal grooves or slots (not shown) in plate 13. Plate 210 contains two cavities, one at 211 which opens the hopper supply at 42 into 56 as shown in FIG. 10 and which closes off the hopper supply as shown in FIG. 11, the other cavity or aperture 212 opens the excess-return system to the hopper supply 42 as shown in FIG. 11. Cavity 212 functions the same as plate 270 (FIG. 14) whereby the cavity can be opened or closed as desired allowing any overflow of product to return to the hopper supply 42 instead of mold cavity 25. Everything else in this modification operates as stated previously.

As described, a stationary or movable hopper can be employed in the type of molding apparatus disclosed in addition to controlling the amount of product molded which allows greater operating flexibility.

Figures 12, 13, 14:
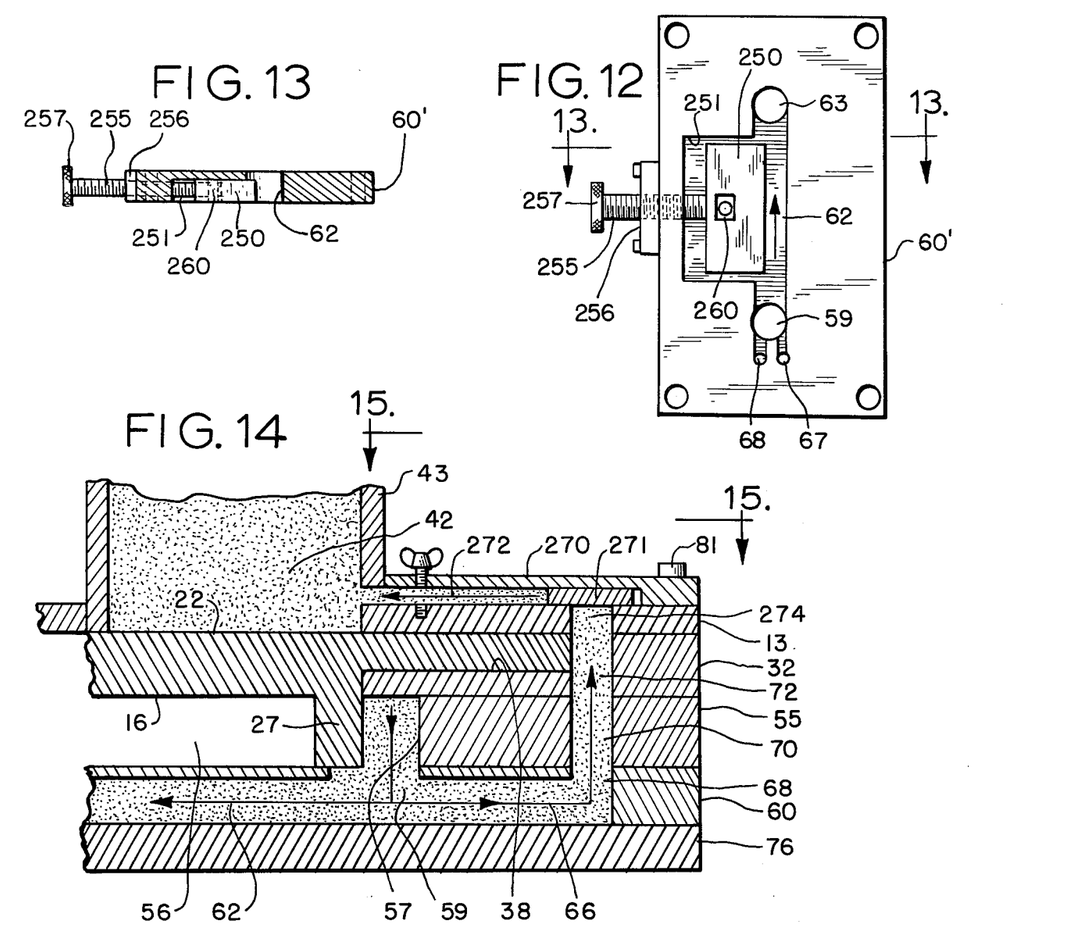
FIG. 12 being a bottom plan view of the transition plate.
FIG. 13 being a cross-sectional view of the transition plate taken substantially on line 13—13 of FIG. 12.
FIG. 14 being a cross-sectional view of the molding apparatus in longitudinal section incorporating an adjustable pressure plate for the return system.

DESCRIPTION OF FIGS. 12–13

These figures represent a modification of transition plate 60, best shown in FIG. 5 which incorporates an adjustable slide plate 250 which is housed within a cavity 251 in the bottom of plate 60'. The slide plate 250 is arranged to throttle or constrict and/or enlarge channel 62 which varies the volume of channel 62, which in turn determines the density to which the food product is compressed in the patty mold cavity 25.

By manually rotating knob 257 thereby turning shaft 255 which is threaded through journal 256, plate 60', and one side of slide plate 250, slide plate 250 moves in and out enabling the volume of channel 62 to be predetermined.

Pin 260 is fastened through shaft 255 so that shaft 255 cannot be completely removed from 250 while rotating knob 257 and also enables the slide 250 to be moved in and out of channel 62.

This addition to plate 60 represents another feature to the preferred embodiment.

Figure 15:
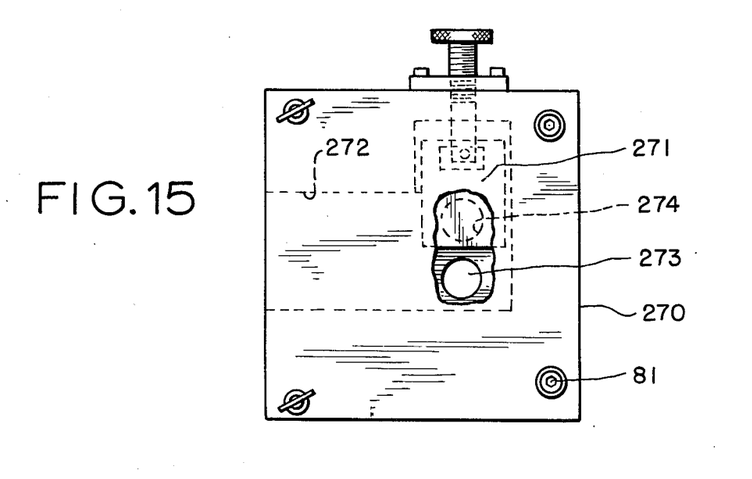
FIG. 15 being a partly broken away top plan view taken substantially on line 15—15 of FIG. 14.

DESCRIPTION OF FIGS. 14–15

In this embodiment the only difference from the preferred embodiment is plate 270 which lies directly above the aft portion of plate 13 and extending leftwardly to the hopper. Two holes 273, 274 are drilled into the aft portion of plate 13, the new holes 273, 274 being directly above passageways 71, 72 of plate 32. The additional plate 270 now fits on top of plate 13, everything else being the same as in the original embodiment.

Plate 270 has a slideable/adjustable plate 271 which operates the same as plate 60' in FIG. 12. Plate 270 enables the excess-return system by way of slide plate 271 to lead into passage 272 in plate 270 which leads back into the hopper supply 42.

The purpose of plate 270 is to insure there will be no overflow in patty cavity 25, but to allow the overflow if there is one to return to the hopper supply, thus not wasting any food product.

Thus a novel, effective and simplified patty molding device has been provided wherein parts are easily assembled and disassembled for ease in cleaning and repair and the drives correlate the movements of the respective parts so it is virtually impossible to cause malfunctioning.

Various modification will now become apparent from the above disclosure, which is intended to be as broadly covered as the law allows in the appended claims:

I claim:

1. Molding apparatus comprising a support, a mold having a stationary section secured to the support and a movable section, means associated with the movable section for moving said movable section between product-receiving and mold filling positions, one of said sections having a mold cavity and the other of said sections having inlet means and passage means leading from the inlet means, supply means communicating with the inlet means for charging the same with a predetermined quantity of product, means associated with said one section operable for scavenging the product in said inlet means and compressing it into the passage means and having means operable for closing off of said supply means to said inlet means, means communicating said passage means into said mold cavity upon relative movement of said movable section from product-receiving position to mold-filling position, and return means in said other section operable for recirculating excess product in said inlet means and passage means through said supply means, and means selectively throttling said return means for controlling compaction overflow of the product in the mold cavity.

2. The invention according to claim 1 and means for delivering a separator sheet to a position for receiving a patty as it is discharged from the mold cavity.

3. Molding apparatus comprising a support frame, a mold having a stationary section secured to the frame and having a movable section, means associated with said movable section for moving said movable section between product-receiving and mold-filling positions, one of said sections having a mold cavity and the other of said sections having inlet means and passage means leading from the inlet means, supply means communicating with the inlet means for charging the same with a predetermined quantity of product, means associated with said one section operable for scavenging the product in said inlet means and compressing it into said passage means and having means operable for closing off of said supply means to said inlet means, means operable for communicating said passage means into said mold cavity upon predetermined relative movement of said movable section from product-receiving position to mold-filling position, and return means in said other section operable for recirculating excess product in said inlet means and passage means through said supply source during mold-filling, and an ejector disposed to move through said mold cavity, operating means operatively connecting said ejector with said movable mold section and including means operable for withdrawing the ejector from the mold cavity, and means operable for cocking the ejector, and means operable for tripping said cocking means and driving the ejector through the mold cavity for engaging and discharging the product therein, and said cocking means comprising a shaft with a ratchet wheel thereon, a pawl normally biased to engaged position with the teeth of the ratchet wheel an operating lever connected to the shaft for swinging movement therewith, energy storing means operative between the frame and said lever adapted to store energy upon movement of the lever from uncocked to cocked position, unidirectional drive means connecting the movable mold section with said lever for transferring force driving the movable mold section to said lever only in the cocking direction, means connected to said unidirectional means for releasing said cocking means upon said movable section moving to a position clear of said mold cavity to permit unobstructed passage of the ejector through the cavity in a discharging movement to the patty formed therein.

4. The invention according to claim 3 and a conveyor means for receiving patties discharged from the mold cavity, and means for discharging a separator sheet of paper or the like onto the conveyor immediately preceding the discharge of a patty for descent thereupon.

5. The invention according to claim 4 and said separator sheet discharging means comprising a tray for directing each sheet beneath the patty mold, and means comprising knife means for cutting the sheet with said tray into discreet lengths and actuated by said means driving said ejector.

6. The invention according to claim 5 and said operative connection for the ejector comprising a push rod connected to said movable mold section, and said movable mold section being reciprocal with respect to said stationary section, and said push rod having a yoke, and a lever swingable to and fro within said yoke, said yoke and rod operative to swing the lever in one direction only to a cocked position and thereafter release the lever, said lever having a linear driving connection with said ejector, means for guiding said linear driving connection in a predetermined path, knife means mounted on said guiding means in the path of movement of said linear driving connection for driving engagement thereby and cutting the separator sheet into said discreet lengths.

7. In a molding apparatus, a feeder for particulate material, mold assembly means having a pair of relatively movable portions, one portion having an intake communicating with the feeder and the other portion having a molding cavity wherein a product is molded by the mold assembly means, means in said portions for delivering the material from the inlet to said cavity, means shifting the movable portion of the mold assembly means between an intake position for receiving a quantity of said material in the intake and a molding position for forming the product with the other portion of said mold assembly means, means for ejecting the product from the cavity comprising tamper means mounted adjacent said other portion of said mold assembly means, means cocking said tamper means preparatory to ejecting the product from said mold assembly means, means releasing said cocking means attendant to said mold assembly means being disposed in molding position for permitting said tamper means to discharge said product, and means correlating the entry and exit of said tamper means with respect to said molding cavity comprising lost-motion self regulating yieldable means operatively interconnecting said tamper means with said movable portion of said mold assembly means for compensatively interphasing the operation thereof.

8. The invention according to claim 7 and said interconnecting means comprising a linkage connecting said movable portion with said tamper means and including spring means operable in compression to urge said tamper means to cocked position and in tension to urge it into said cavity.

* * * * *